Patented June 10, 1941

2,245,509

UNITED STATES PATENT OFFICE 2,245,509

PRODUCTION OF 4,4'-DICHLORODIBUTYL ETHER

Hans-Georg Trieschmann, Mannheim, Germany, assignor to I. G. Farbenindustrie Aktiengesellschaft, Frankfort-on-the-Main, Germany, a corporation of Germany No Drawing. Application June 26, 1940, Serial No. 342,503. In Germany July 29, 1939

3 Claims. (Cl. 260—614)

The present invention relates to the production of 4,4'-dichlorodibutyl ether and particularly to the production of this ether by the interaction of hydrogen chloride and 4-chlorobutanol.

It is generally known to produce aliphatic ethers by leading aliphatic alcohols at elevated temperatures and under superatmospheric pressure over catalysts having a dehydrating action. This method cannot be utilized for the production of 4,4'-dichlorodibutyl ether from 4-chlorobutanol because this compound is converted into tetrahydrofurane when treated with dehydrating catalysts under superatmospheric pressure and at elevated temperatures.

According to the present invention 4,4'-dichlorodibutyl ether is prepared by heating 4-chlorobutanol with hydrogen chloride. Depending on the reaction conditions employed, 1,4-dichlorobutane and tetrahydrofurane may be formed as by-products. In order to effect the reaction as completely as possible, the reaction is carried out at temperatures between about 110° and about 170° C. The most suitable temperature is within the range of 120° and 165° C. Temperatures exceeding 170° C. cause the formation of higher molecular by-products and are not practicable.

The reaction is carried out in the liquid phase. Consequently, the pressure employed during the reaction should be so high that at least part of the 4-chlorobutanol is in the liquid phase, the total pressure corresponding to the vapor pressure of all constituents of the reaction mixture at the reaction temperature. By employing inert diluent gases, such as nitrogen, the pressure may be increased beyond the pressure of the reactants, for example, up to 50 or 100 atmospheres or even more.

The relative proportion of the reactants may be varied although it has been found that very advantageous results are obtained when the amount of hydrogen chloride is about equimolecular to the amount of 4-chlorobutanol. At least 0.5 molecular proportion of hydrogen chloride should be used; however, hydrogen chloride may even be used in excess, e. g. 1.5 or more molecular proportions for each molecular proportion of 4-chlorobutanol.

The reaction may be carried out for example by charging liquid 4-chlorobutanol into a pressure-tight vessel and pressing in anhydrous hydrogen chloride and then heating to reaction temperature. The hydrogen chloride may also be pressed in during or after the heating of the 4-chlorobutanol. Instead of anhydrous hydrogen chloride, there may also be used aqueous hydrochloric acid, preferably in the presence of acid substances capable of binding water, such as concentrated phosphoric or sulphuric acid.

Catalysts may be employed in my process, though the conversion of 4-chlorobutanol into 4,4'-dichlorodibutyl ether is highly satisfactory without the aid of catalysts. Suitable catalysts are those which have proved suitable for promoting the formation of alkyl halides from olefines and hydrogen halides, such as metal halides, e. g. the chlorides of iron, bismuth, mercury, zinc or cadmium, or iodine or active carbon, silica gel and the like which may be impregnated with a metal salt of the type referred to above.

The following example will illustrate methods of practicing the invention although the invention is not limited to the example.

Example

In an enamelled pressure-tight vessel of 30 liters volume there are heated 6 kilograms of 4-chlorobutanol and 2 kilograms of hydrogen chloride at 145° C. for six hours. By fractionating the reaction mixture, there are obtained 3.8 kilograms of unchanged starting material which is again used, 0.4 kilogram of 1,4-dichlorobutane, 1.5 kilograms of 4,4'-dichlorodibutyl ether and small amounts of tetrahydrofurane. The yield of 4,4'-dichlorodibutyl ether amounts to 77 per cent calculated on the amount of the 4-chlorobutanol converted.

What I claim is:

1. A process for the production of 4,4'-dichlorodibutyl ether which consists in heating 4-chlorobutanol and hydrogen chloride in the liquid phase under superatmospheric pressure to temperatures exceeding 110° C.

2. A process for the production of 4,4'-dichlorodibutyl ether which consists in heating one molecular proportion of 4-chlorobutanol with at least 0.5 molecular proportion of hydrogen chloride in the liquid phase under superatmospheric pressure to temperatures exceeding 110° C.

3. A process for the production of 4,4'-dichlorodibutyl ether which consists in heating one molecular proportion of 4-chlorobutanol with at least 0.5 molecular proportion of hydrogen chloride in the liquid phase under superatmospheric pressure to temperatures between 120° and 165° C.

HANS-GEORG TRIESCHMANN.